(12) United States Patent
Dumbrique (10) Patent No.: US 11,919,470 B2
(45) Date of Patent: Mar. 5, 2024

(54) AIRBAG ARRANGEMENT FOR A VEHICLE

(71) Applicant: Autoliv ASP, Inc., Ogden, UT (US)

(72) Inventor: Conrad Dumbrique, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 85 days.

(21) Appl. No.: 17/741,676

(22) Filed: May 11, 2022

(65) Prior Publication Data

US 2023/0365094 A1   Nov. 16, 2023

(51) Int. Cl.
*B60R 21/214* (2011.01)
*B60R 21/2338* (2011.01)

(52) U.S. Cl.
CPC ........ *B60R 21/214* (2013.01); *B60R 21/2338* (2013.01); *B60R 2021/23382* (2013.01); *B60R 2021/23386* (2013.01)

(58) Field of Classification Search
CPC .............. B60R 21/214; B60R 21/2338; B60R 2021/23382; B60R 2021/23386
See application file for complete search history.

(56) References Cited

U.S. PATENT DOCUMENTS

| | | | | |
|---|---|---|---|---|
| 8,328,228 B2 * | 12/2012 | Lee | ....................... | B60R 21/214 280/743.1 |
| 8,403,358 B2 * | 3/2013 | Choi | ..................... | B60R 21/214 280/743.2 |
| 10,589,708 B2 * | 3/2020 | Cho | .................... | B60R 21/0136 |
| 10,625,701 B2 * | 4/2020 | Cho | ....................... | B60R 21/214 |
| 10,682,974 B2 * | 6/2020 | Thomas | ................. | B60R 21/232 |
| 11,541,838 B2 * | 1/2023 | Navarro Arranz | .... | B60R 21/215 |
| 11,560,116 B2 * | 1/2023 | Navarro Arranz | .... | B60R 21/214 |
| 11,560,117 B2 * | 1/2023 | Navarro Arranz | .... | B60R 21/214 |
| 11,618,408 B2 * | 4/2023 | Freisler | ................. | B60R 21/232 280/729 |
| 11,648,908 B2 * | 5/2023 | Sung, II | ................. | B60R 21/231 280/730.1 |
| 11,702,029 B1 * | 7/2023 | Golman | .............. | B60R 21/2338 280/743.2 |
| 11,745,688 B2 * | 9/2023 | Min | ....................... | B60R 21/237 280/730.1 |

\* cited by examiner

*Primary Examiner* — Jason D Shanske
*Assistant Examiner* — Joselynn Y Sliteris
(74) *Attorney, Agent, or Firm* — Harness, Dickey & Pierce, P.L.C.; Stephen T. Olson (57) ABSTRACT

An airbag arrangement for a vehicle includes a housing, an airbag cushion and a guide arrangement. The housing is mountable to a roof of the vehicle. The airbag cushion is normally stored within the housing and deployable from the housing. The guide arrangement guides the airbag cushion from a stowed position within the housing to a deployed position and includes a continuous cord having a first end attached to a first point on the airbag cushion and a second end attached to a second point on the airbag cushion. The guide arrangement further includes a plurality of mounting member for attachment to the roof. The plurality of mounting members slidably receive the continuous cord, The mounting members and the continuous cord cooperate to fix the airbag cushion in free space upon deployment with only the roof as structural support. One of the mounting members may be a unidirectional device to prevent bidirectional movement of the continuous cord and limit slack in the continuous cord upon deployment of the airbag cushion.

18 Claims, 11 Drawing Sheets

AIRBAG ARRANGEMENT FOR A VEHICLE

FIELD

The present disclosure generally concerns inflatable occupant restraint systems for vehicles. More particularly, the present disclosure relates to an airbag arrangement for a vehicle mountable to a roof of the vehicle including an inflatable cushion downwardly deployable from proximate the roof of the vehicle.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

In the event of an accident or impending accident, a sensor within the vehicle measures abnormal deceleration, for example, the airbag is triggered to inflate within a few milliseconds with gas produced by a device commonly referred to as an "inflator". The inflated airbag cushions the vehicle occupant from impact forces.

To a more limited extent, it is been generally proposed to provide airbag systems for a vehicle having a roof airbag. Known roof airbags may provide an inflatable barrier between the occupants and the roof of the vehicle to protect occupants in the event of vehicle rollover or similar conditions. Known airbag systems including an airbag mounted to and deployable from a vehicle roof have not been used to protect vehicle occupants from front impact collisions, for example, given the need to fix the airbag to absorb impact energy.

While known occupant restraint systems, including systems having an airbag mountable to and deployable from a vehicle roof may have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide an airbag arrangement for a vehicle having an airbag cushion deployable from a roof of the vehicle, the airbag cushion fixable in free space with only the roof as structural support to absorb impact energy in a horizontal direction.

It is a related object of the present teachings to provide an airbag arrangement for a vehicle including mounting members and a continuous cord that cooperate to fix an airbag cushion in free space upon deployment with only the roof as structural support.

It is another related object of the present teachings to provide an airbag arrangement for a vehicle include an airbag cushion deployable from a roof of the vehicle in a downward direction to absorb impact energy in a horizontal direction.

In accordance with one particular aspect, the present teachings provide an airbag arrangement for a vehicle including a housing, an airbag cushion and a guide arrangement. The housing is mountable to a roof of the vehicle. The airbag cushion is normally stored within the housing and deployable from the housing. The guide arrangement guides the airbag cushion from a stowed position within the housing to a deployed position and includes a continuous cord having a first end attached to a first point on the airbag cushion and a second end attached to a second point on the airbag cushion. The guide arrangement further includes a plurality of mounting member for attachment to the roof. The plurality of mounting members slidably receive the continuous cord, The mounting members and the continuous cord cooperate to fix the airbag cushion in free space upon deployment with only the roof as structural support.

In accordance with another particular aspect, the present teachings provide an airbag arrangement for a vehicle including a housing attachable to a roof of a vehicle and an airbag cushion normally stored within the housing and deployable from a lateral side of the housing. The airbag cushion includes and upper panel, and first and second side panels. The upper panel deploys generally parallel to the roof. The first and second side panels downwardly extending from the upper panel upon deployment of the airbag cushion. At least one internal tether maintains a predetermined lateral spacing between the first and second side panels.

In accordance with yet another particular aspect, the present teachings provide

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. "Exemplary" as used herein means serving as a typical or representative example or instance and does not necessarily mean special or preferred.

Figure 1:
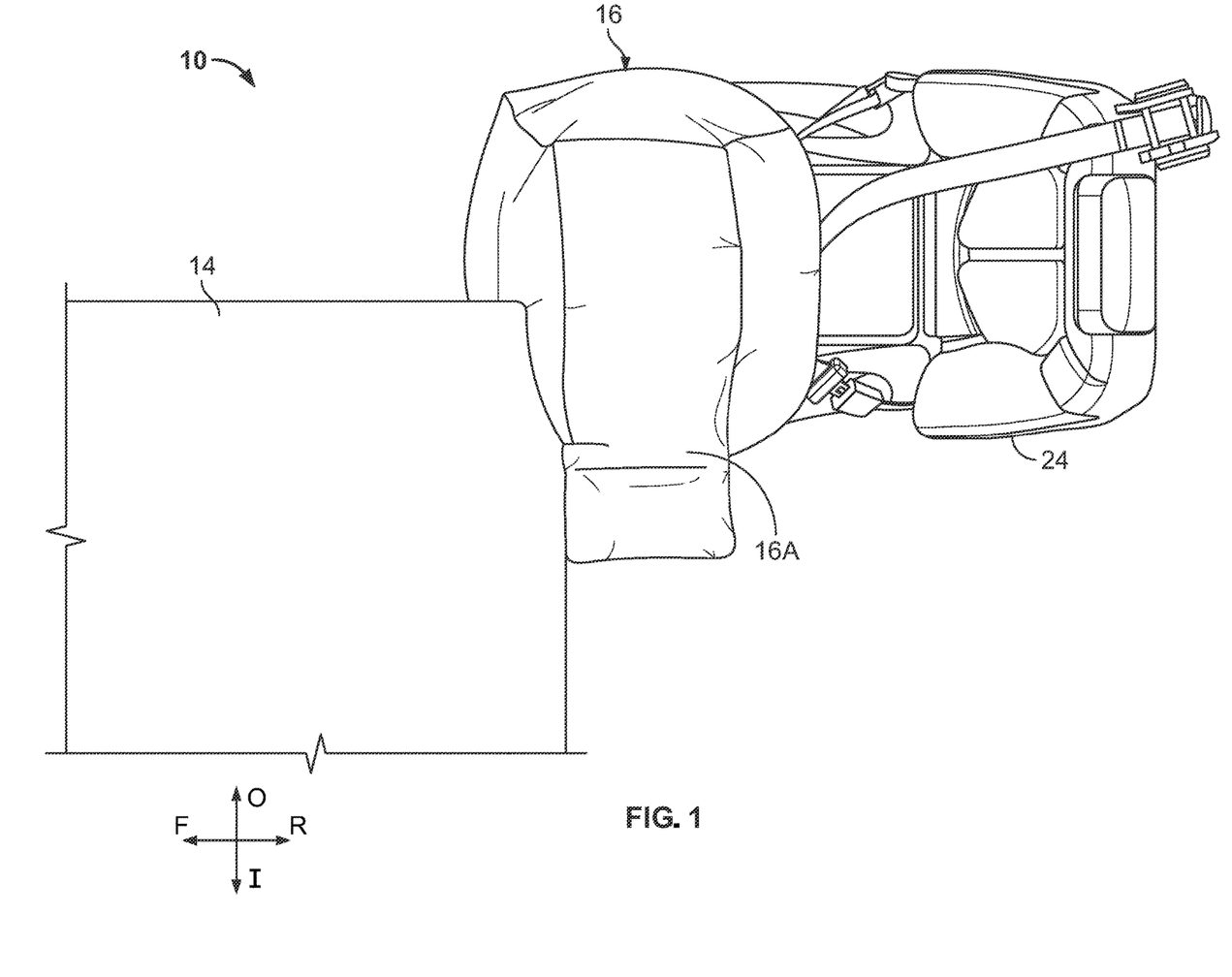
FIG. 1 is a top view of an airbag arrangement for a vehicle in accordance with the present teachings, the airbag arrangement shown operatively associated with a roof of a vehicle and a vehicle seat, an airbag cushion of the airbag arrangement shown after deployment.
Figure 2:
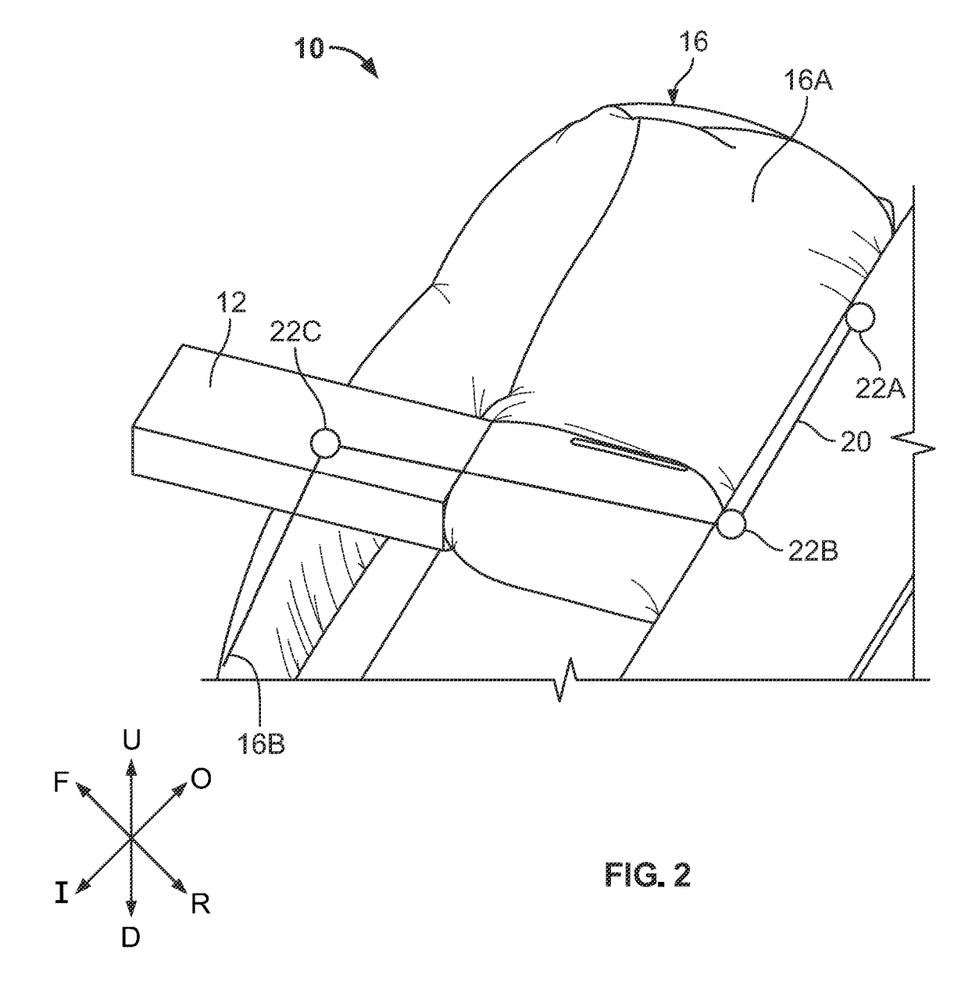
FIG. 2 is a perspective view further illustrating the airbag arrangement of the present teachings.
Figure 3:
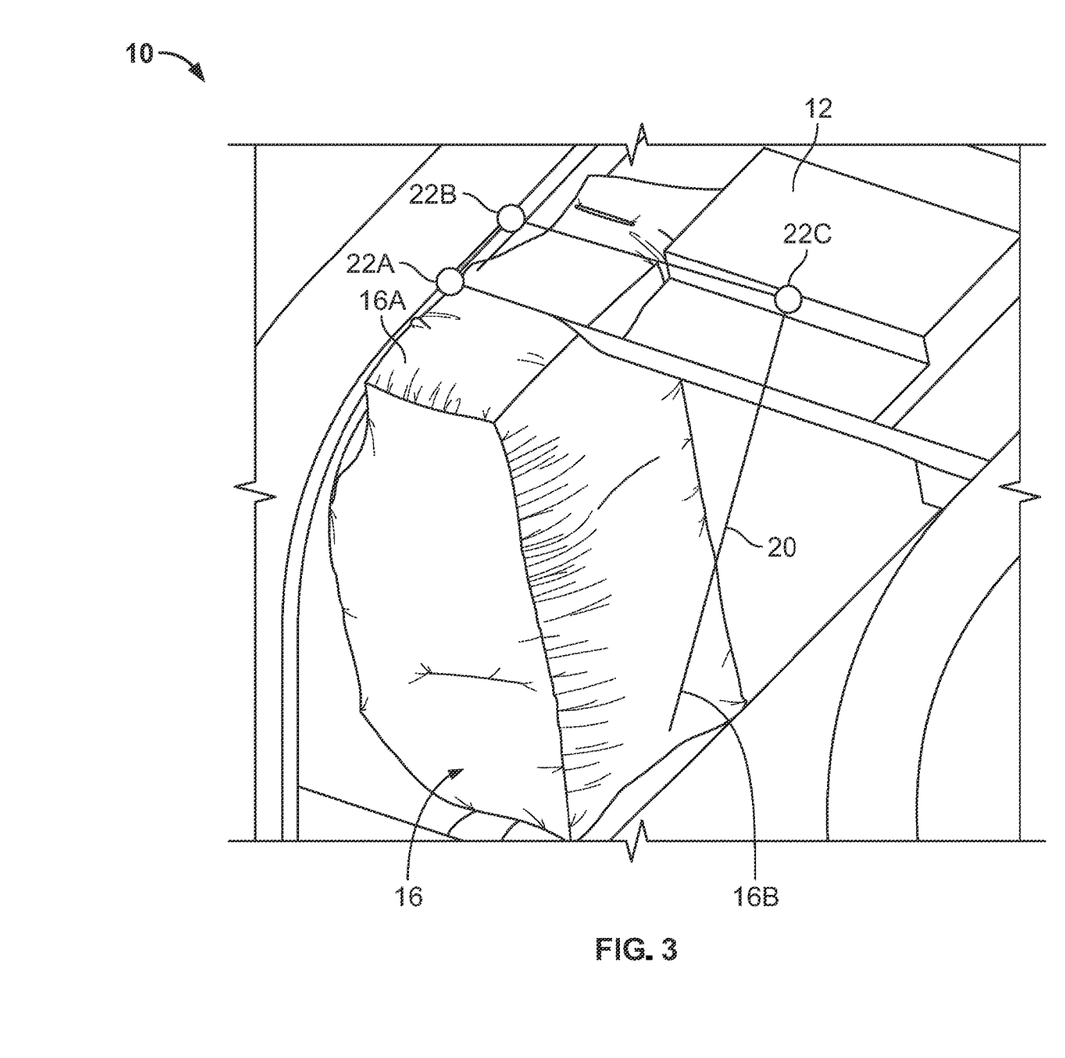
FIG. 3 is another perspective view further illustrating the airbag arrangement of the present teachings.

With general reference to the drawings, an airbag arrangement for a vehicle in accordance with the present teachings is illustrated and generally identified at reference character 10. The airbag arrangement 10 is shown in FIGS. 1 through 3 in operative association with portions of a vehicle. In one particular application, the vehicle may be an autonomous vehicle with flexible seating locations. It will be understood, however, that the present teachings are applicable for various other vehicles, including autonomous and non-autonomous vehicles. In the embodiment shown in the drawings, the airbag arrangement 10 is shown for protecting an occupant seated in a seat 24 on a right hand side of the vehicle. Relative vehicle directions are shown in various views as U (up), D (down), I (inboard), O (outboard), F (forward), and R (rearward). It will be understood that these directional references are not limiting.

The airbag arrangement 10 is shown to generally include a housing 12 mounted to a roof 14 of the vehicle and an inflatable airbag cushion 16 normally stored within the housing 12 and deployable from the housing 12 in response to predetermined collision events. The airbag arrangement 10 is further shown to generally include a guide arrangement 18 for guiding the airbag cushion 16 from a stowed position within the housing 12 to a deployed positions for absorbing impact energy during a collision event. The guide arrangement 18 includes a continuous cord or tether 20 and a plurality of mounting members 22A, 22B and 22C. As will be understood further below, the mounting members 22A, 22B and 22C cooperate with the continuous cord to fix the airbag cushion 16 in free space upon deployment with only the roof 14 of the vehicle for structural support.

For the particular application shown, the housing 12 of the airbag arrangement 10 is mounted to the roof 14 of the vehicle along a longitudinal centerline of the vehicle and forward of the seat 24 for an occupant to be protected by the airbag cushion 16. Under the guidance of the guide arrangement 18 and in view of the shape of the airbag cushion 16, the airbag cushion 16 deploys downwardly from the housing 12 and in an outboard direction relative to the housing 12.

One airbag cushion 16 suitable for use with the present teachings is shown in the drawings and will be further described herein. It will be understood, however, that other airbag cushion constructions and configurations may be readily adapted for use with the present teachings. For example, the airbag cushion 16 may be constructed of a greater or lesser number of panels.

As particularly shown in the drawings, the airbag cushion 16 may include an upper panel or upper surface 16A for deployment adjacent to and generally parallel with the roof 14 of the vehicle. The airbag cushion 16 may further include an inboard panel or left side panel 16B, an outboard panel or right side panel 16C, and a central panel 16D. The central panel 16D may laterally extend between the inboard panel 16B and the outboard panel 16C to define a rearward facing surface 16E, a downward facing surface 16F, and a forward facing surface 16G of the airbag cushion 16. As shown, the central panel 16D may extend downwardly from a rear edge of the upper panel 16A to define the rearward facing or rear surface 16E of the airbag cushion 16, around a lower most surface of the airbag cushion 16 to define the downward facing or lower surface 16F of the airbag cushion 16, and up to a forward edge of the upper panel 16B to define the forward facing or forward surface 16G. The airbag cushion 16 may include one or more internal tethers 25 extending between the inboard panel 16B and the outboard panel 16C to maintain a predetermined laterally lateral distance between the inboard panel 16B and the outboard panel 16C and maintain a generally planar shape of the upper panel 16A upon deployment of the upper panel 16A. Importantly, the upper panel 16A defines a reaction surface of the airbag cushion 16 that engages the roof 14 of the vehicle when an occupant seated in the seat 24 engages the rearward facing surface 16E of the central panel 16D during a collision event.

In the embodiment illustrated, the plurality of guide members includes three guide members 22A, 22B, and 22C. It will be understood, however, that the airbag arrangement 10 may include a greater or lesser number of guide members within the scope of the present teachings. The guide members 22A, 22B, and 22C are attached to the roof 14 of the vehicle, directly or indirectly, and slidably receive the continuous cord 20. One of the guide members 22C may be a unidirectional guide member that only allows the continuous cord 20 to slide therethrough in a single direction. In the embodiment illustrated, the guide member 22C near the stowed airbag cushion 16 is the unidirectional guide member so that the least amount of slack in the continuous cord 20 occurs during deployment of the airbag cushion 16. The unidirectional guide member 22C may be a ratch type of device or any other type of device limiting the sliding direction of the continuous cord 20. The unidirectional guide member 22C may act like a "progress capture pulley" typically used in rock climbing as safety device or for hauling equipment. The other guide members 22A and 22B may be bidirectional guide members in the form of loops or other suitable structure. Exemplary locations for the guide members 22A, 22B, and 22C will be discussed below.

Figure 6:
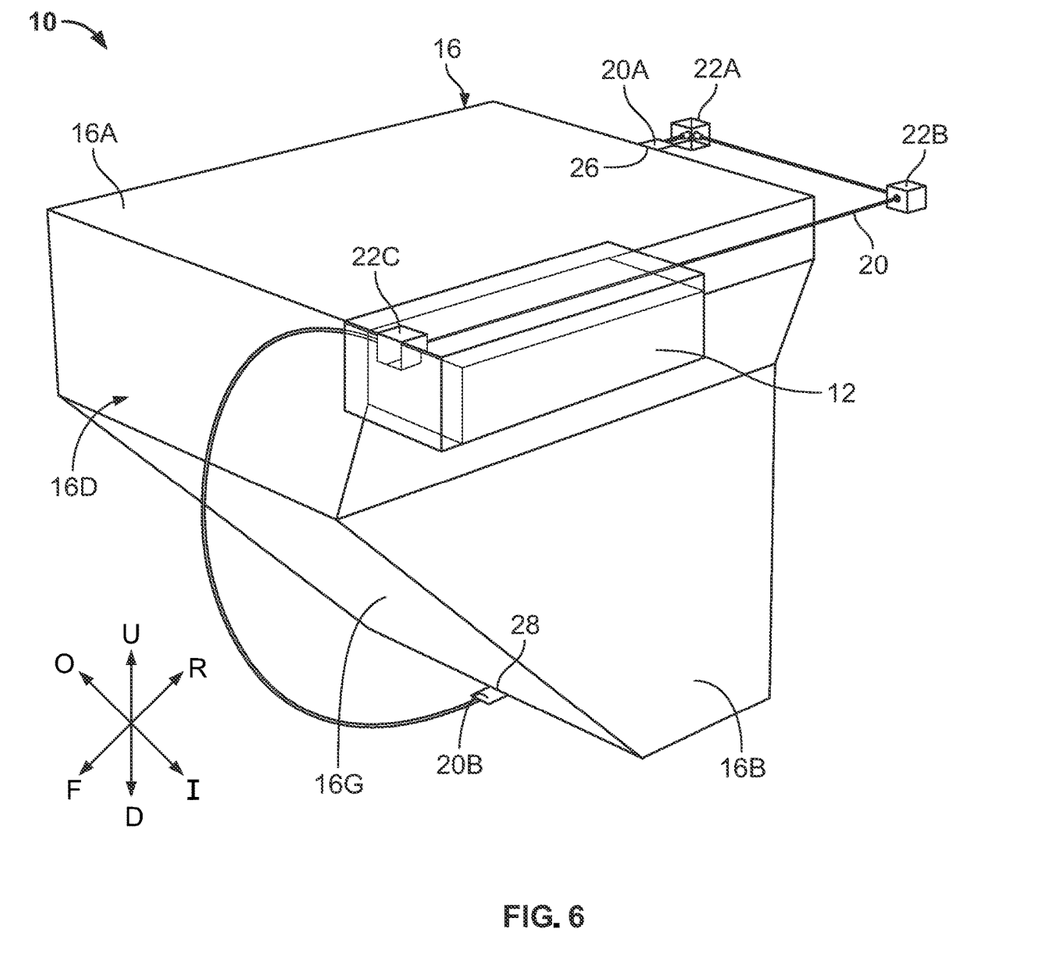
FIG. 6 is a front and inboard side perspective view of the airbag arrangement of the present teachings removed from the vehicle for purpose of illustration.
Figure 7:
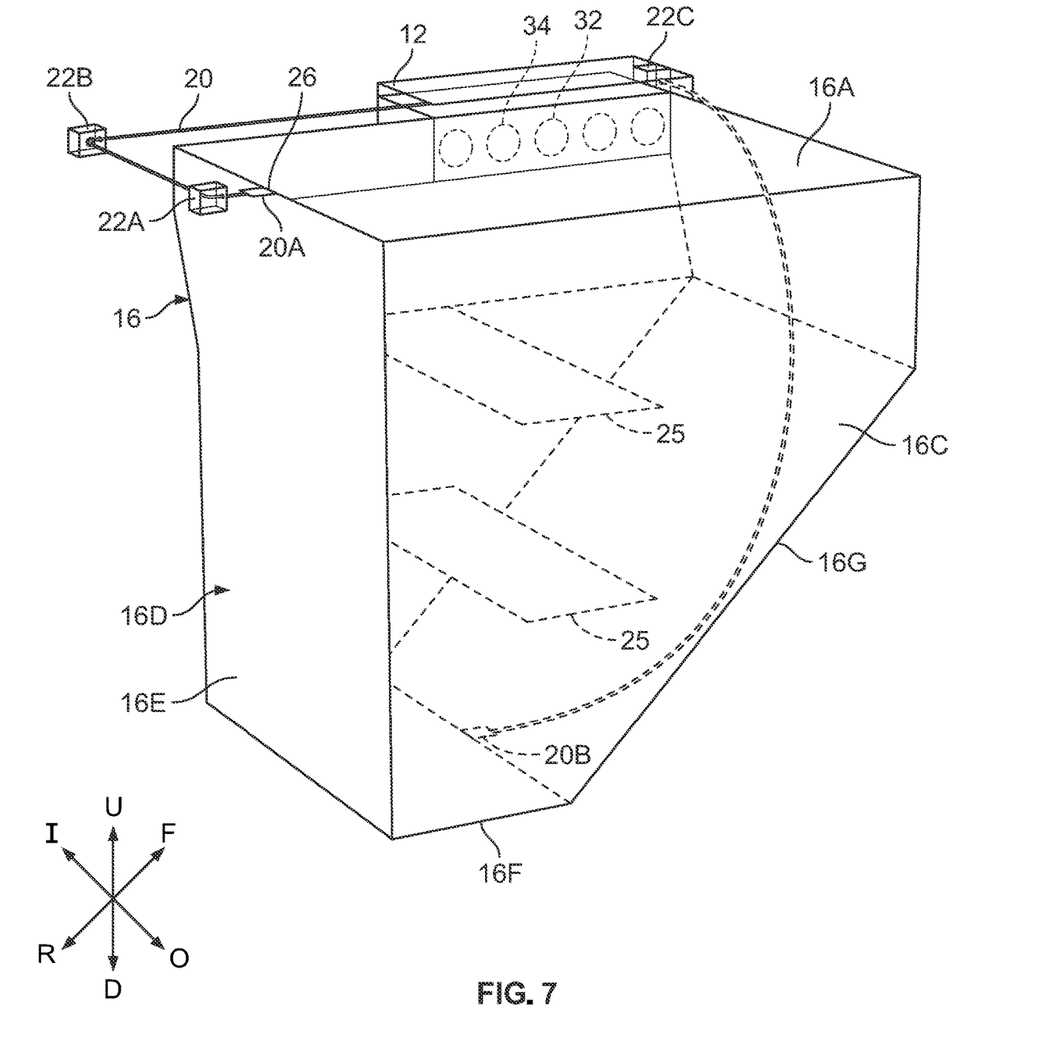
FIG. 7 is a rear and outboard side perspective view of the airbag arrangement of the present teachings removed from the vehicle for purpose of illustration.
Figure 8:
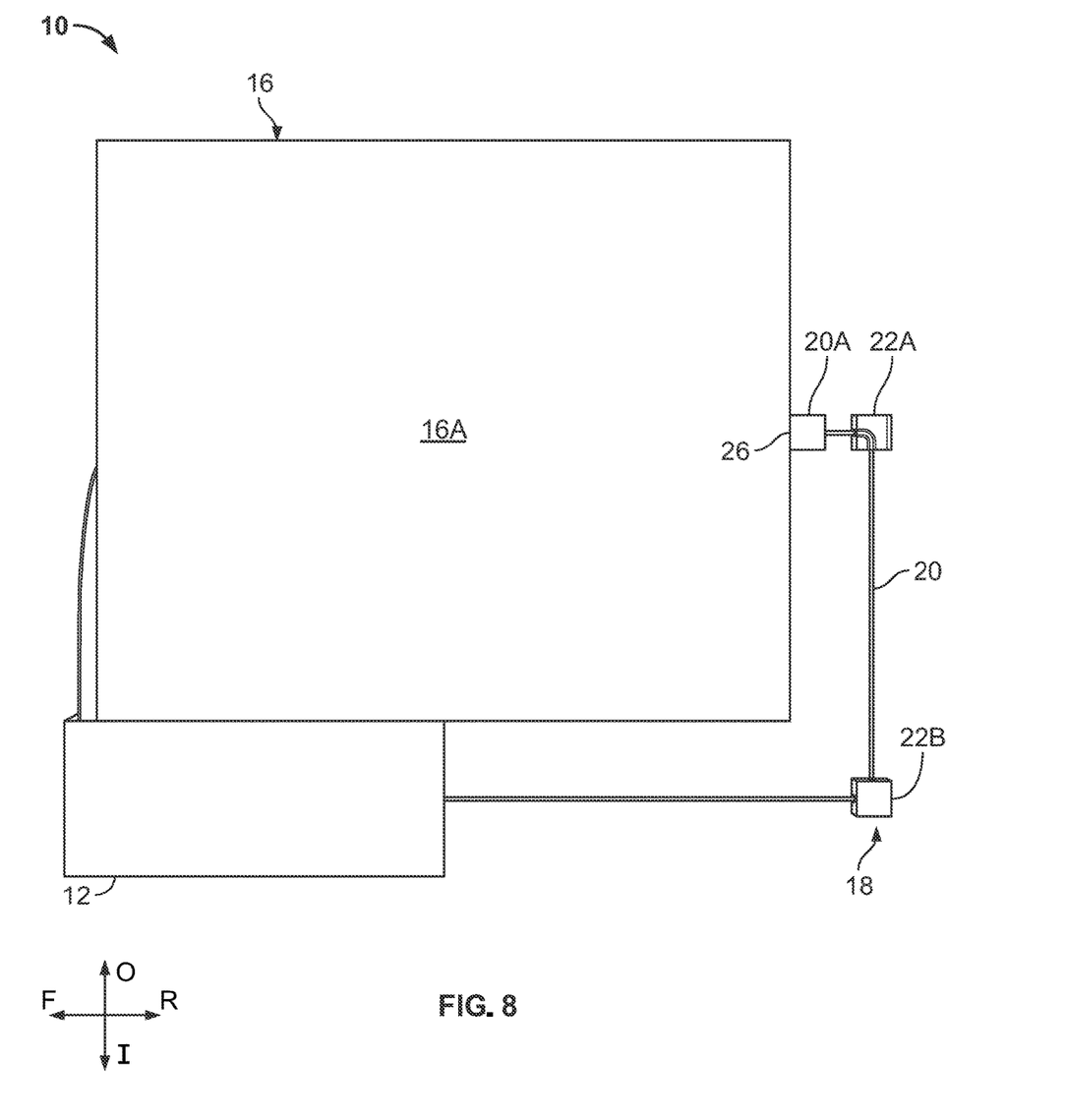
FIG. 8 is a top view of the airbag arrangement of the present teachings removed from the vehicle for purpose of illustration.
Figure 9:
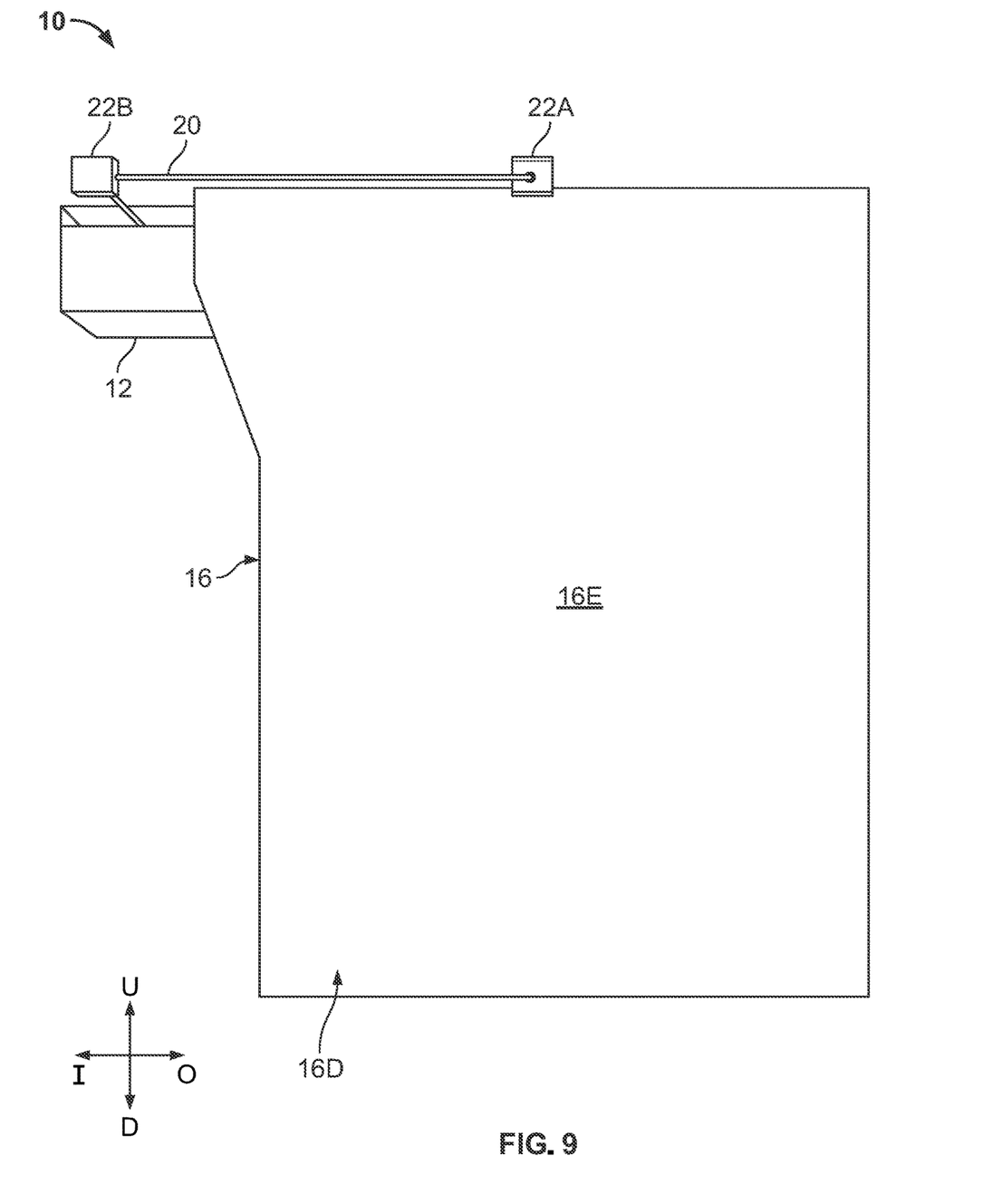
FIG. 9 is a front view of the airbag arrangement of the present teachings removed from the vehicle for purpose of illustration.
Figure 10:
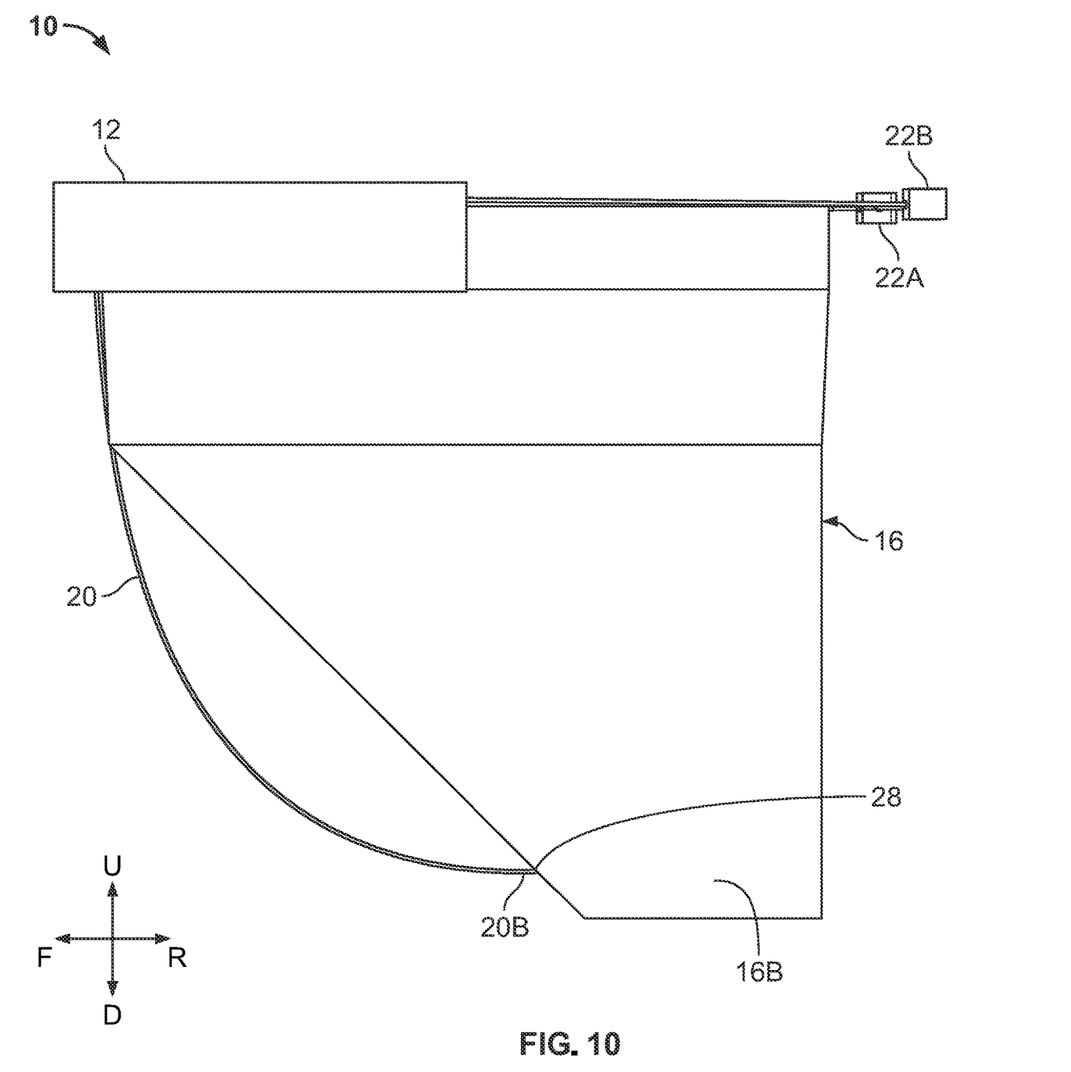
FIG. 10 is an inboard side view of the airbag arrangement of the present teachings removed from the vehicle for purpose of illustration.
Figure 11:
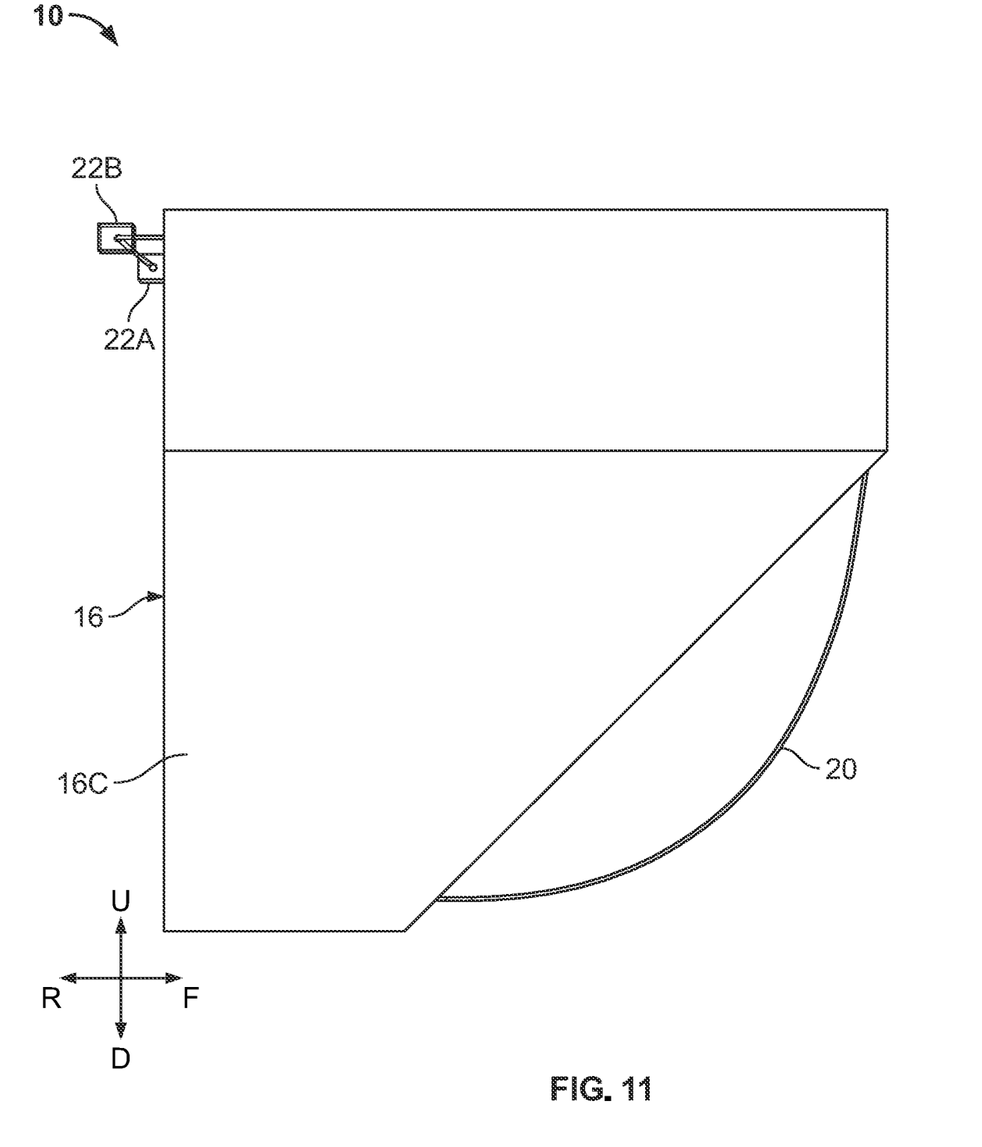
FIG. 11 is an outboard view of the airbag arrangement of the present teachings removed from the vehicle for purpose of illustration.

The continuous cord 20 includes a first end 20A attached to the airbag cushion 16 at a first attachment point 26 and a second end 20B attached to the airbag cushion 16 at a second attachment point 28. The first attachment point 26 may be proximate an uppermost part of the airbag cushion 16. As shown in FIG. 7, for example, the first end 20A of the continuous cord 20 may be attached to the airbag cushion 16 proximate an intersection of the rear edge of the upper panel 16A and an upper edge of the front surface 16E, which is the primary surface 16E of the airbag cushion 16 to receive an occupant during a collision event. The second end 20B of the continuous cord 20 may be attached to the airbag cushion 16 proximate a lowermost part of the airbag cushion 16. As shown in FIG. 6, for example, the second end 20B of the continuous cord may be attached to the airbag cushion 16 at a transition of the central panel 16D from the lower surface 16F to the rear surface 16E.

The continuous cord 20 extends from the first attachment point 26 to the first guide member 22A. The first guide member 22A may be spaced in a lateral direction (e.g., in an outboard direction) and in a front-rear direction (e.g., in a rearward direction) relative to the housing 12. After passing through the first guide member 22A, the continuous cord 20 extends to and passes through the second guide member 22B. The second guide member 22B may be spaced in the rear direction relative to the housing 12. From the second guide member 22B, the continuous cord 20 extends to and passes through third guide member 22C. The third guide member 22C may be located proximate the housing 12. From the third guide member 22C, the continuous cord 20 extends to the second attachment point 28. While this section of the continuous cord 20 is shown in the drawings routed on the outside of the airbag cushion 16, this section may alternatively be internally routed relative to the airbag cushion 16.

With continued reference to the drawings, a method of deploying the airbag cushion 16 of the airbag arrangement 10 of the present teachings will be described. The airbag cushion 16 is normally in a stowed position within the housing 12. The airbag cushion 16 may be rolled and/or folded within the housing 12 in any suitable manner well known in the art to satisfy packaging and deployment objectives. Deployment of the airbag cushion 16 occurs in response to activation of an inflator 30. The inflator 30 activates in response to a sensed condition indicating a predetermined vehicle collision or event. The inflator 30, its activation, and the sensing of the vehicle collision or event will be understood to be conventional insofar as the present teachings are concerned. The inflator 30 delivers inflation gases to the airbag cushion 16 through a plurality of vents 32 in a vertically extending tether 34.

Figure 4:
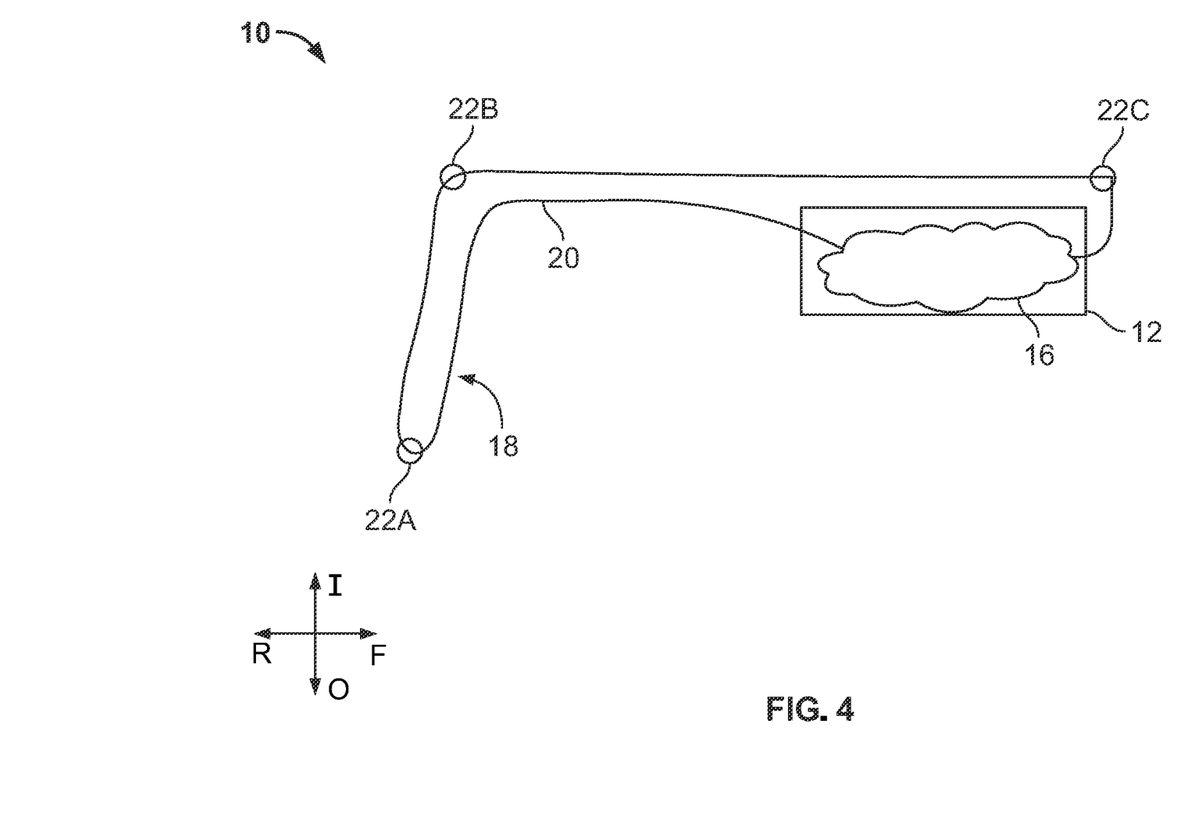
FIG. 4 is a simplified bottom view illustrating the airbag arrangement of the present teachings and showing a layout for the components of the airbag arrangement prior to deployment of the airbag cushion.
Figure 5:
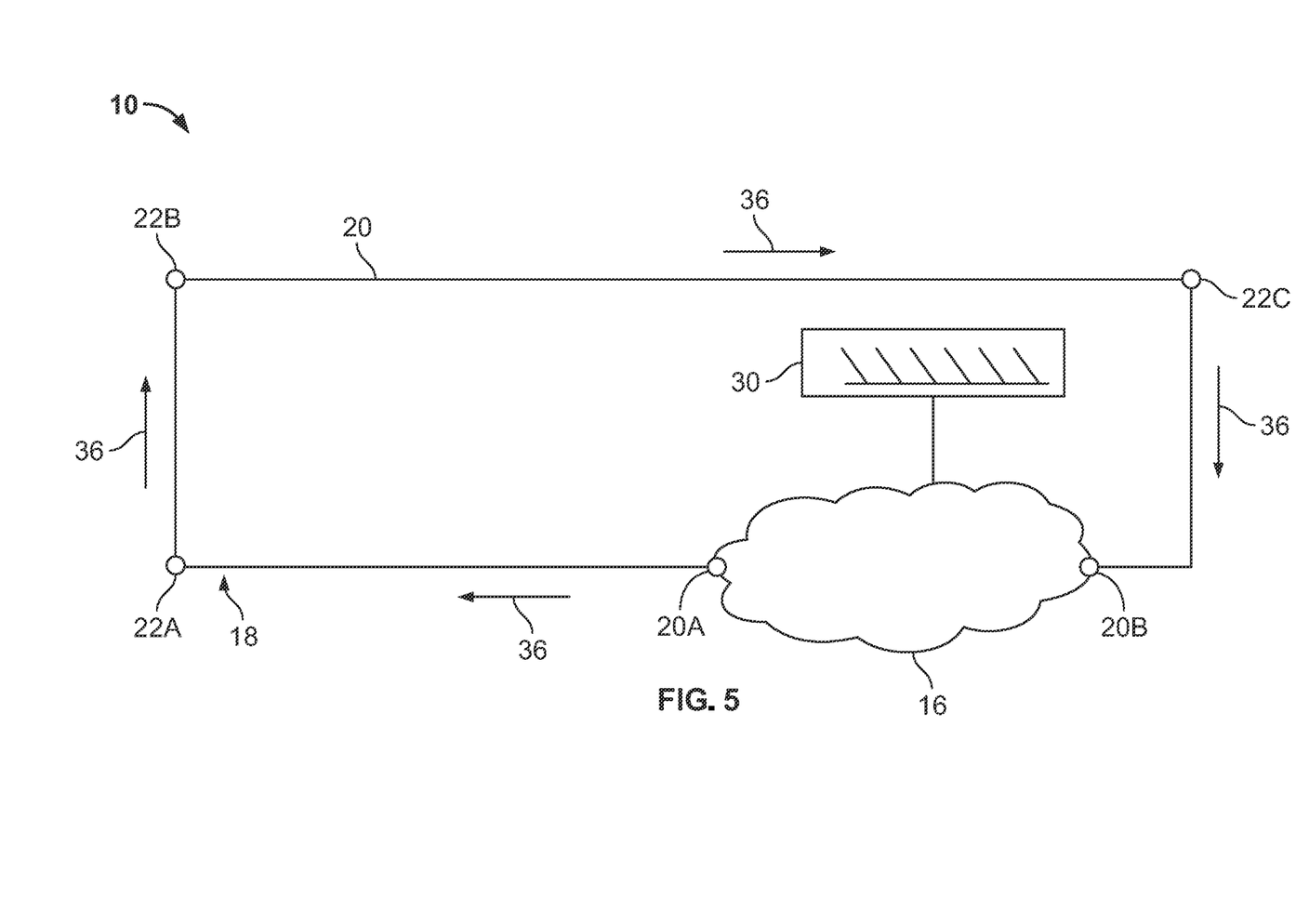
FIG. 5 is a schematic view illustrating the airbag arrangement of the present teachings and the travel of the continuous cord upon inflation of the continuous cord.

As the airbag cushion 16 downwardly deploys from the housing 16, the second end 20B of the continuous cord is pulled in the downward direction and the tensioned in such a manner that the continuous cord is pulled through the first, second and third guide members 22A, 22B, and 22C in the direction indicated by arrows 36 in the schematic view of FIG. 4. This tensioning of the continuous cord 20 draws the first attachment point 26 of the airbag cushion 16 to the first guide member 22A.

When the airbag cushion 16 is fully deployed/inflated, the upper panel 16A is oriented proximate to parallel to the roof 14 of the vehicle. It will be understood that the term "parallel" does not require the upper panel 16A to be strictly parallel to the roof 14 of the vehicle but only sufficiently parallel to define a reaction surface of the airbag cushion 16. In this regard, in response to a predetermined collision event such as a front collision, the airbag cushion 16 will deploy and the rearward facing surface 16E will be positioned to receive the occupant of the seat 24 and absorb impact energy. The unidirectional nature of the guide member 22C maintains the positioning of the airbag cushion 16 throughout the collision event. The internal tethers 26 maintain a desired lateral spacing between the outboard facing and inboard facing 16C and 16B of the airbag cushion 16.

When the airbag cushion 16 is fully deployed, the airbag cushion 16 is fixed in free space with the mounting members 22A, 22B, 22C and the continuous cord 20 and the roof 14 of the vehicle provides the only support. As used herein, the term "fixed" will be understood to mean that the airbag cushion 16 is held in place upon deployment from adjacent the roof 14 to absorb impact energy from a collision selected from a front impact collision, a side impact collision, a rear impact collision, and combinations therefrom.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An airbag arrangement for a vehicle, the airbag arrangement comprising:
   a housing mountable to a roof of the vehicle;
   an airbag cushion normally stored within the housing and deployable from the housing; and
   a guide arrangement for guiding the airbag cushion from a stowed position within the housing to a deployed position, the guide arrangement including a continuous cord having a first end attached to a first point on the airbag cushion and a second end attached to a second point on the airbag cushion, the guide arrangement further including a plurality of mounting members for attachment to the roof, the plurality of mounting members slidably receiving the continuous cord,
   wherein the mounting members and the continuous cord cooperate to fix the airbag cushion in free space upon deployment with only the roof as structural support.

2. The airbag arrangement of claim 1, wherein the first point on the airbag cushion is proximate an uppermost part of the airbag cushion and the second point on the airbag cushion is proximate a lowermost part of the airbag cushion.

3. The airbag arrangement of claim 1, wherein the plurality of mounting members includes a first mounting member spaced in a lateral direction and in a front-rear direction relative to the housing, the continuous cord extending from the first point on the airbag cushion to and through the first mounting member.

4. The airbag arrangement of claim 3, wherein upon deployment, the first point on the airbag cushion is drawn by the continuous cord to the first mounting member in response to inflation of the airbag cushion.

5. The airbag arrangement of claim 3, wherein upon deployment, the airbag cushion is anchored to the roof by the continuous cord at the first mounting member and further anchored to the roof at the housing.

6. The airbag arrangement of claim 3, wherein the plurality of mounting members further includes a second mounting member and a third mounting member, the third mounting member located at the housing, the continuous cord extending from the first mounting member, through the second mounting member, through the third mounting member and to the second point on the airbag cushion.

7. The airbag arrangement of claim 1, wherein the airbag cushion includes an upper panel configured and arranged to be positioned adjacent to and parallel with the roof of the vehicle upon deployment of the airbag cushion and tensioning of the continuous cord.

8. The airbag arrangement of claim 7, wherein the airbag cushion further comprises first and second side panels downward extending from the upper panel and at least one internal tether for maintaining a predetermined lateral spacing between the first and second side panels upon inflation of the airbag cushion.

9. The airbag arrangement of claim 1, wherein the airbag cushion is deployable in a downward direction and a lateral direction from the housing.

10. The airbag arrangement of claim 1, wherein at least one of the plurality of mounting members is a unidirectional guide member that only allows the continuous cord to slide therethrough in a single direction.

11. The airbag arrangement of claim 1, in combination with the vehicle.

12. The airbag arrangement and vehicle of claim 11, wherein the housing and the plurality of mounting members are directly or indirectly connected to the roof.

13. A method of using the airbag arrangement of claim 1 to deploy the airbag cushion, the method comprising:
   guiding the first point on the airbag cushion to a first mounting member in response to inflation of the airbag cushion.

14. A method of protecting an occupant of the vehicle with the airbag arrangement of claim 1, the method comprising:
   downwardly deploying the airbag cushion from adjacent the roof;
   fixing the airbag cushion in free space with the mounting members and the continuous cord upon deployment with only the roof as structural support; and
   absorbing impact energy from a collision event selected from the group consisting of a front impact collision, a rear impact collision, a side impact collision, and combinations thereof.

15. An airbag arrangement for a vehicle, the airbag arrangement comprising:
   a housing attachable to a roof of the vehicle; and
   an airbag cushion normally stored within the housing and deployable from a lateral side of the housing, the airbag cushion including:
   an upper panel for deployment generally parallel to the roof;
   first and second side panels downwardly extending from the upper panel upon deployment of the airbag cushion; and
   at least one tether for maintaining a predetermined lateral spacing between the first and second side panels,
   wherein upon deployment of the airbag cushion, the upper panel is disposed adjacent the roof and extends in a lateral direction and a front-rear direction relative to the housing.

16. The airbag arrangement of claim 15, wherein upon deployment of the airbag cushion, a front panel of the airbag cushion is oriented to absorb impact energy from a collision.

17. An airbag arrangement for a vehicle, the airbag arrangement comprising:
   a housing attachable to a roof of the vehicle;
   an airbag cushion normally stored within the housing and deployable from a lateral side of the housing, the airbag cushion including:
   an upper panel for deployment generally parallel to the roof;
   first and second side panels downwardly extending from the upper panel upon deployment of the airbag cushion; and
   at least one tether for maintaining a predetermined lateral spacing between the first and second side panels; and
   a guide arrangement for guiding the airbag cushion from a stowed position within the housing to a deployed position, the guide arrangement including a continuous cord having a first end attached to a first point on the airbag cushion and a second end attached to a second point on the airbag cushion.

18. The airbag arrangement of claim 17, wherein the guide arrangement includes:
   a plurality of mounting members for attachment to the roof, the plurality of mounting members slidably receiving the continuous cord.

* * * * *